United States Patent Office 3,576,845
Patented Apr. 27, 1971

3,576,845
ACETYLENICALLY SUBSTITUTED ARALKYL CARBAMATES
John F. Cavalla, Isleworth, and Alan C. White and Gillian M. Sandison, Windsor, England, assignors to John Wyeth & Brothers Limited, Taplow, Maidenhead, England
No Drawing. Filed Nov. 14, 1967, Ser. No. 683,023
Int. Cl. C07c *125/06*
U.S. Cl. 260—482
12 Claims

ABSTRACT OF THE DISCLOSURE

A group of acetylenically- (e.g., propargyl-) substituted arethyl carbamates and thiocarbamates is described. Representative members of this group exhibit anti-inflammatory activity when tested on laboratory animals according to standard test procedures.

---

This invention relates to a new series of carbamates and thiocarbamates.

The present invention provides carbamates and thiocarbamates of the general formula:

$$\begin{array}{c} Ar \diagdown \diagup CH_2-O\overset{X}{\underset{\|}{C}}-\overset{R^3}{\underset{|}{N}}-R^4 \\ C \\ R^1-(CH_2)_n \diagup \diagdown CH-C\equiv C-H \\ | \\ R^2 \end{array} \quad (I)$$

in which Ar is a substituted or unsubstituted aryl or heteroaryl radical, $R^1$ is a hydrogen atom, a hydroxy radical, a carbamoyloxy radical, a dialkylaminoethyl radical or a substituted or unsubstituted alkyl, aryl, heteroaryl or aralkyl radical, $R^2$ is a hydrogen atom or an alkyl radical, $R^3$ and $R^4$ which may be the same or different each can represent a hydrogen atom, or an alkyl radical or $R^3$ and $R^4$ together with the nitrogen atom to which they are attached can form a heterocyclic ring which may contain a further hetero atom. X is an oxygen or sulphur atom and $n$ is 0 or 1.

The compounds of the above general Formula I have interesting pharmacological properties, for example antiinflammatory activity and/or are intermediates in the preparation of similar compounds. They are also useful in testing for pharmacological activity in laboratory animals.

Examples of tests which can indicate that a compound has anti-inflammatory activity are those described by Winter et al. in Proc. Soc. Exp. Biol. Med., III, 544 (1962), Buttle et al., in Nature, 179, 629 (1957); Konzett and Rossler in Arch. Path. Pharmac. 195, 71 (1940); and Newbould in Brit. Jour. Pharm. Chemoth., 21, 127–137 (1963).

The compounds of the above general Formula I generally can be prepared by methods known in the art for the production of carbamates and thiocarbamates. We have found it convenient to start from the corresponding alcohols. Thus, the present invention also provides a process for the preparation of the compounds of the general Formula I, which comprises the step of acylating an alcohol of the general formula $$\begin{array}{c} Ar \diagdown \diagup CH_2OH \\ C \\ R^1-(CH_2)_n \diagup \diagdown CH-C\equiv C-H \\ | \\ R^2 \end{array} \quad (II)$$

(in which Ar, $R^1$, $R^2$ and $n$ have the meanings defined above) with an appropriate carbamic or thiocarbamic acid acylating agent. The term "carbamic or thiocarbamic acid acylating agent," as used herein means one or more compounds capable of converting a $$-CH_2OH \text{ group into a } -CH_2O-\overset{X}{\underset{\|}{C}}-N\diagdown \overset{R^3}{\underset{R^4}{}}$$

group in one or more reaction steps. Methods of converting hydroxyl group to carbamate or thiocarbamate groups are well known in the art and any such method which will give the desired carbamates or thiocarbamates of the invention can be used.

In general terms, the carbamates can be prepared by acylating an alcohol of general Formula II with at least one equivalent of an acylating agent of the general formula:

$$(Y)-\overset{X}{\underset{\|}{C}}-N\diagdown \overset{(R^3)}{\underset{R^4}{}}$$

or a functional derivative thereof, or plurality of compounds capable of forming such an acylating agent in situ (in which $R^3$, $R^4$ and X have the meanings defined above, and Y is a halogen atom or an alkoxy radical).

We have found it very convenient to react a carbonyl halide or thiocarbonyl halide of the general formula $$\text{Hal}-\overset{X}{\underset{\|}{C}}-\text{Hal}$$

(where Hal represents a halogen atom, advantageously chlorine) with an alcohol of general Formula II to form the corresponding carbonyl or thiocarbonyl halide of Formula R—CX Hal where R represents $$\begin{array}{c} Ar \diagdown \diagup CH_2O- \\ C \\ R^1-(CH_2)_n \diagup \diagdown CH-C\equiv C-H \\ | \\ R^2 \end{array}$$

and to react this compound with ammonia or an amine of the general formula $$HN\diagdown \overset{R^3}{\underset{R^4}{}}$$

where $R^3$ and $R^4$ have the meanings defined above. The reaction of the alcohol with the halide of formula $$\text{Hal}-\overset{X}{\underset{\|}{C}}-\text{Hal}$$

is carried out in the presence of a tertiary organic base, for example in pyridine or triethylamine solution preferably at a temperature of from −10° C. to 25° C. advisably from −5° C. to 10° C. If desired, an inert solvent, e.g., toluene may be added. The carbonyl or thiocarbonyl halide of formula R—CX Hal may be separated, e.g., by extraction with benzene, and reacted with ammonia or the desired amine.

In a modification of this method, the alcohol of general Formula II can be reacted with a carbamyl or thiocarbamyl halide or ester of general formula $$\overset{R^3}{\underset{R^4}{}}\diagdown N-\overset{X}{\underset{\|}{C}}-Y$$

(in which $R^1$, $R^2$, X and Y have the meanings defined above) if desired by heating. When Y is an alkoxy radical a catalyst is added, for example a strong acid (such as sulphuric, toluene-p-sulphonic acid or trifluoroacetic acid) or a metal alkoxide (such as aluminum isopropoxide or potassium tert. butoxide).

In an alternative method, the alcohol of general Formula II is reacted with a phenoxy or alkoxy formylating agent e.g., a halide of formula

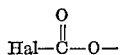

phenyl which is capable of splitting off the phenoxy group on subsequent reaction with ammonia or an amine of general formula

Reaction of the alcohol with a phenoxyformyl halide (e.g., the chloride) generally in the presence of a base (e.g., pyridine) and preferably at 0–25° C. is suitable to give the corresponding phenoxycarbonyloxy derivative of formula R—CO—O—phenyl. Reaction of this intermediate, e.g., after separation from the reaction solution, with ammonia or the amine generally yields the desired carbamate as the phenoxy group is easily replaced by ammonia or an amine. This reaction is preferably carried out in the liquid anhydrous amine or liquid ammonia or an anhydrous solution of the amine or ammonia.

A general method of preparation, but for compounds where $R^3$ and $R^4$ both are hydrogen, is to react an alcohol of general Formula II with cyanic or thiocyanic acid, or a cyanate or thiocyanate (for example sodium or potassium cyanate) in the presence of a strong acid such as trifluoromethyl or trichloromethyl acetic acid or a hydrohalic acid. This reaction usually is carried out in an inert organic solvent such as dichloromethane, ether or tetrahydrofuran.

A general method of preparation for compounds where $R^4$ is hydrogen is to react an alcohol of general Formula II with an isocyanate or isothiocyanate of general formula $R^3NCX$.

Whichever method of preparation is the most suitable for the preparation of a particular compound is chosen. The starting materials for the process of the invention can be prepared by standard methods. Thus, the preparation of some of the starting materials of general Formula II is described in our copending application Ser. No. 619,207, filed Feb. 28, 1967, now abandoned, by reduction of a corresponding compound of general Formula II but containing a —COOAlkyl grouping instead of a —CH$_2$OH grouping.

For example, the sodio derivative of an ester of the general formula:

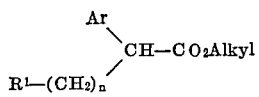

can be formed by reaction thereof with sodium hydride or sodamide in solution, e.g., in dimethyl formamide or dry toluene. Subsequent reaction of the sodio derivative with an alkynyl halide of general formula:

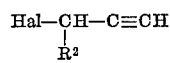

provides an ester of general formula:

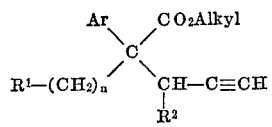

and a sodium halide which can be removed therefrom. The ester can be reduced, with a reducing agent capable of reducing the ester group but not the acetylenic bond (e.g., lithium aluminum hydride) to give the alcohol.

In the general formulae given in this specification, Ar and R each can be a phenyl, substituted phenyl [for example substituted by alkoxy (preferably methoxy or ethoxy), aralkyloxy (e.g., benzyloxy, halogen (e.g., chlorine), haloalkyl (for example trifluoromethyl), or alkyl (e.g., methyl or ethyl) in the o-, m- and/or p-positions] 1- or 2-naphthyl, 2- or 3-furyl, 2- or 3-thienyl or 2-, 3- or 4-pyridyl group. $R^1$ can also be a hydrogen atom, or an alkyl, aralkyl (e.g., benzyl) or dialkylamino-ethyl (e.g., a dimethyl- or diethylamino ethyl) radical, $n$ can be zero or one. $R^2$ can be a hydrogen atom or an alkyl radical (preferably containing 1 to 4 carbon atoms, e.g., methyl), $R^3$ and $R^4$ are hydrogen atoms, alkyl radicals, which may be straight or branched chained (e.g., a methyl, ethyl, iso-propyl, n-propyl, iso-butyl or n-butyl radical) or together form a ring (e.g., to complete a pyrrolidine, piperidine or morpholine ring system). X preferably is oxygen though it may be sulphur. The radicals comprising aliphatic groups, for example alkyl and alkoxy radicals generally contain 1 to 7, preferably 1 to 4 carbon atoms. It is apparent that any substituents present should not interfere with the reactions desired above.

As stated above, the compounds of the invention have interesting pharmacological properties, namely, anti-inflammatory action, and the present invention also provides a pharmaceutical composition comprising a compound of general Formula I and a pharmaceutical carrier, which can be solid or liquid, or a mixture thereof.

Solid form compositions include powders, tablets, dispersible granules, capsules, cachets, and suppositories. Liquid form compositions include solutions, suspensions, emulsions, syrups and elixirs. The active ingredient can be dissolved or suspended in a pharmaceutically acceptable sterile liquid carrier, such as water, an organic solvent or a mixture of both. Preferably a liquid carrier is one suitable for parenteral injection so that the composition can be made a sterile one suitable for injection. Where the active ingredient is sufficiently soluble it can be dissolved in normal saline as a carrier; if it is too insoluble for this it can often be dissolved in a suitable organic solvent, for instance aqueous propylene glycol or polyethylene glycol solutions. Aqueous propylene glycol containing from 10 to 75% of the glycol by weight is generally suitable. Liquid pharmaceutical compositions which are sterile solutions or suspensions can be utilized by intramuscular, intraperitoneal or subcutaneous injection. In many instances a compound is orally active and can be administered orally either in liquid or solid composition form.

The following nonlimiting examples illustrate the invention, Examples 1–3 illustrating the preparation of the alcohol starting materials.

EXAMPLE 1

Ethyl 2,2-diphenyl-4-pentynoate

Ethyl 2,2-diphenylacetate (240 g., 1.0 mole) in dry dimethyl formamide (300 ml.) was added at room temperature to a stirred suspension of sodium hydride (48 g., 1.0 mole of a 50% dispersion in oil) in dimethyl formamide (250 ml.). An exothermic reaction occurred and the mixture which became yellow in color was maintained at 20–25° C. by external cooling. The reaction mixture was stirred for 3 hours at room temperature, cooled to between 10–15° C. and propargyl bromide (119 g., 1.0 mole) added dropwise at such a rate that the internal temperature did not rise above 30° C. The brown reaction mixture was left overnight. The dimethyl formamide was removed under reduced pressure to leave an oil which was taken up in benzene and washed with water. After drying over magnesium sulphate and removal of the benzene, the title compound was obtained as a pale yellow oil which crystallized on triturating with 2-propanol. 208.6 g., of colorless rhombs were obtained, M.P. 45–6° C.

*Analysis.*—Found (percent): C, 81.8; H, 6.4; $C_{19}H_{18}O_2$ requires (percent): C, 82.0; H, 6.5.

EXAMPLE 2

2,2-diphenyl-4-pentyne-1-ol

Ethyl 2,2-diphenyl-4-pentynoate (46.5 g., 0.18 mole) in dry ether (150 ml.) was added dropwise to a stirred suspension of lithium aluminum hydride (6.9 g., 0.18 mole) in ether (200 ml.). On completion of the addition the mixture was stirred under reflux for 2 hours. The reaction mixture was cooled and water (20 ml.) cautiously added. The resulting white suspension was dried over magnesium sulphate and kieselguhr added. Filtration and evaporation of the solvent yielded 41.5 g., of the title compound as an oil which crystallized and recrystallized from aqueous ethanol to give 32.9 g., chunky rhombs, M.P. 62–3° C.

Analysis.—Found (percent): C, 86.6; H, 6.9. $C_{17}H_{16}O$ requires (percent): C, 86.4; H, 6.8.

EXAMPLE 3

1-carbamoyloxy-2,2-diphenyl-4-pentyne (a) Triethylamine (6 g., 0.06 mole) in dry toluene (50 ml.) was added dropwise over a period of 1 hour to a stirred solution of phosgene (6.4 g., 0.065 mole) in toluene (50 ml.) cooled to between 0° and 10° C. 2,2-diphenyl-4-pentyne-1-ol (11.8 g., 0.06 mole) in toluene (50 ml.) was then added to the mixture at between −5° and 0° C. On completion of the addition the mixture was stirred at 20° C. for 2 hours then left standing overnight. Ice water (20 ml.) was added to the toluene solution of the carbonyl chloride, the aqueous layer was separated and the organic layer washed with water. Concentrated aqueous ammonia (20 ml.) was added to the stirred organic layer at 0°–10° C. and the whole mixture stirred at room temperature for 2 hours. Water was added, the layers were separated and the organic layer was washed, separated and dried over MgSO₄. Evaporation to dryness afforded the desired carbamate (15.5 g.) as a colorless oil which crystallized from benzene-petrol (B.P. 60–80°) mixture as colorless rhombs, M.P. 122–3° C.

Analysis.—Found (percent): C, 77.3; H, 6.2; N, 4.9. $C_{18}H_{17}NO_2$ requires (percent): C, 77.4; H, 6.1; N, 5.0.

(b) Phenylchloroformate (5.6 g., 0.03 mole) was added dropwise to a stirred solution of 2,2-diphenyl-4-pentyne-1-ol (8.0 g., 0.03 mole) in dry pyridine (15 ml.) and methylene chloride (10 ml.). The pasty reaction mixture was stirred at 5° C. for four hours. Ice water (50 ml.) and ether (50 ml.) were added and the organic layer washed in turn with cold dilute hydrochloric acid and sodium carbonate solution. After drying over magnesium sulphate the ether solution was added to liquid ammonia (approx. 100 ml.). After leaving overnight the ether solution remaining was washed with 5 N sodium hydroxide solution (50 ml.) and water. After working up as described in (a) 5.9 g., of colorless rhombs of the title compound were obtained, M.P. 122–3° C.

EXAMPLE 4 n-Butylcarbamic acid ester of 2,2-diphenyl-4-pentyn-1-ol

The procedure of Example 3(a) was followed using triethylamine (6 g., 0.06 mole), phosgene (50 ml. 12.5% solution, 0.06 mole), and 2,2-diphenyl-4-pentyn-1-ol (11.5 g., 0.06 mole) but replacing the ammonia by n-butylamine (3.65 g., 0.06 mole). After working up as in Example 3 the desired compound was recrystallized from benzene-petrol (B.P. 60–80°) as colorless rhombs (11.3 g.), M.P. 55–56° C.

Analysis.—Found (percent): C, 78.45; H, 7.55; N, 4.3. $C_{22}H_{25}NO_2$ requires (percent): C, 78.7; H, 7.5; N, 4.2.

EXAMPLE 5 n-Methylcarbamic acid ester of 2,2-diphenyl-4-pentyn-1-ol

A mixture of 2,2-diphenyl-4-pentyn-1-ol (5.7 g., 0.03 mole), methyl isocyanate (5.7 g., 0.1 mole) and triethylamine (5 ml.) was stirred at room temperature for 18 hours. The volatile compounds of the reaction mixture were removed by evaporation under reduced pressure. The residue was treated with dilute hydrochloric acid and extracted with ether. After drying the organic solvent was evaporated to leave the title compound as an oil which crystallized on treatment with aqueous ethanol. Recrystallization from aqueous ethanol afforded colorless rhombs, 5.9 g., M.P. 74–5° C.

Analysis.—Found (percent): N, 5.0. $C_{19}H_{19}NO_2$ requires (percent): N, 4.8.

EXAMPLE 6

Ethyl 2-benzyl-2-phenyl-4-pentynoate

Ethyl 1,2-diphenylpropionate (17.8 g., 0.07 mole) in dry dimethyl formamide (60 ml.) was added dropwise to a stirred suspension of sodium hydride (3.4 g., 0.07 mole of a 50% dispersion in oil) in dry dimethyl formamide (50 ml.). On completion of the mildly exothermic reaction the mixture was stirred at room temperature for 2 hours, the reaction mixture was cooled to 0° C. and then propargyl bromide (8.2 g.) in dry dimethyl formamide (10 ml.) was added dropwise. The reaction mixture was allowed to warm to room temperature and after stirring for 2 hours, it was added to water and extracted with benzene. The benzene extracts were washed with water, dried over anhydrous magnesium sulphate and evaporated under reduced pressure to yield ethyl-2-benzyl-2-phenyl-4-pentynoate as a colorless oil, 15.0 g. B.P.$_{0.05\,mm}$ 130–133° C.

Analysis.—Found (percent): C, 81.1; H, 6.9. $C_{20}H_{20}O_2$ requires (percent): C, 82.15; H, 6.9.

EXAMPLE 7

2-benzyl-2-phenyl-4-pentyn-1-ol

Ethyl 2-benzyl-2-phenyl-4-pentynoate (14.6 g., 0.05 mole) was reduced with lithium aluminum hydride as described in Example 2 to give the desired alcohol as a colorless oil, 10.3 g., B.P.$_{0.004\,mm}$ 138–40° C.

Analysis.—Found (percent): C, 85.6; H, 7.3; $C_{18}H_{18}O$ requires (percent): C, 86.4; H, 7.2.

EXAMPLE 8

1-carbamoyloxy-2-benzyl-2-phenyl-pentyne 2-benzyl-2-phenyl-4-pentyn-1-ol (6.0 g., 0.024 mole) was reacted with phosgene (2.7 g., 0.027 mole of a 12.5% solution in toluene), triethylamine (2.4 g., 0.24 mole) and ammonia (10 ml.) as described in Example 3(a). The carbamate was obtained as colorless rhombs from benzene-petrol (B.P. 60–80°). 3.5 g., M.P. 115.5–118° C. were obtained.

Analysis.—Found (percent): C,77.1; H, 6.5; N, 4.3; $C_{19}H_{19}NO_2$ requires (percent): C, 77.8; H, 6.5; N, 4.8.

EXAMPLE 9

2-phenyl-2-(2'-propynyl)-1,3-propanediol

Diethyl-2-phenyl-2-(2'-propynyl)malonate (39.8 g., 0.145 mole) in dry tetrahydrofuran (400 ml.) was added dropwise to a stirred suspension of lithium aluminum hydride (22.25 g.) in dry tetrahydrofuran (400 ml.). On completion of the addition the reaction mixture was stirred under reflux for 15 hours. The mixture was cooled and water (70 ml.) added slowly. The white solid which separated was filtered and the filtercake boiled with isopropyl alcohol (300 ml.) and filtered. The isopropyl alcohol extract and the tetrahydrofuran were evaporated to dryness and distilled yielding two fractions (i) B.P.$_{0.002\,mm}$ 112–115° C. which consisted of ethyl-2-hydroxy methyl-2-phenylpentynoate (4.9 g.) and (ii) B.P.$_{0.02\,mm}$ 133–6° C. of the required diol (9.9 g.).

EXAMPLE 10

2-phenyl-2-(2'-propynyl)-1,3-propanediol monocarbamate

A mixture of 9.5 g. (0.05 mole) of 2-phenyl-2-(2'-propynyl)-1,3-propane diol, urethane (9.8 g., 0.12 mole) and toluene (40 ml.) was treated under reflux in an apparatus fitted with a constant take off head and a fractionating column. When no further water was evolved aluminum isopropoxide (0.5 g.) was added to the reaction mixture. The mixture was heated under reflux for 72 hours in which time 7 ml. of a toluene-ethanol azeotrope was removed. The toluene was removed under reduced pressure and the orange oil taken up in benzene. The benzene was washed with water, dried over $MgSO_4$, and evaporated to give an orange oil which crystallized. After recrystallization twice from benzene/60–80 petrol, 1.11 g. of colorless rhombs were obtained, M.P. 129.5–131° C.

*Analysis.*—Found (percent): C, 66.3; H, 6.5; N, 6.5. $C_{13}H_{15}O_3N$ requires (percent): C, 67.0; H, 6.4; N, 6.0.

EXAMPLE 11

2-phenyl-2-(2'-propynyl)-1,3-propanediol dicarbamate

2 - phenyl - 2 - (2'-propynyl)-1,3-propanediol (4.76 g., 0.025 mole), pyridine (10 ml.) and phenylchloroformate (7.34 g., 0.05 mole) in methylene chloride (10 ml.) were reacted together as described in Example 3(b) and then, after working up as described in that Example were added to liquid ammonia (180 ml.); 2.4 g. of colorless rhombs of the desired product were obtained, recrystallized from benzene/petrol (40–60°), M.P. 122–3° C.

*Analysis.*—Found (percent): C, 61.0; H, 6.0; N, 10.1. $C_{14}H_{18}O_4N_2$ requires (percent): C, 60.9; H, 5.85; N, 10.1.

EXAMPLE 12

Ethyl o-chlorophenylphenylacetate o-Chlorophenylphenylacetonitrile (48.9 g., 0.21 mole) was heated under reflux with absolute ethanol (87 ml.) and concentrated sulphuric acid (23 ml.) for 28 hours. After cooling, the reaction mixture was poured onto ice and basified with concentrated aqueous ammonia. After extraction with chloroform the oil obtained was recrystallized from aqueous ethanol; 22.0 g., M.P. 22–4° C.

*Analysis.*—Found (percent): Cl, 12.6. $C_{17}H_{15}ClO_2$ requires (percent): Cl, 12.9.

EXAMPLE 13

Ethyl 2-(o-chlorophenyl)-2-phenyl-4-pentynoate

The ester obtained in Example 12 (22.0 g., 0.08 mole) in dry ether (50 ml.) was added dropwise to a suspension of sodamide (3.40 g., 0.09 mole) in liquid ammonia (100 ml.). Propargylbromide (7.0 ml., 0.09 mole) in ether (25 ml.) was added dropwise. The solution was stirred for two hours and ammonium chloride (13 g.) was added and the mixture left overnight. The organic layer was separated, washed twice with water, dried over magnesium sulphate and evaporated to leave an oil (8.4 g.) which was homogenous by gas-liquid chromatography.

EXAMPLE 14

2-(o-chlorophenyl)-2-phenyl-4-pentyn-1-ol

The ester of Example 13 (8.4 g., 0.027 mole) was reduced with lithium aluminum hydride (4.2 g.) as described in Example 11 using tetrahydrofuran instead of ether as a solvent. On distillation, 6.2 g. of a pale yellow oil was obtained, B.P.$_{0.03\ mm.}$ 142–3° C.

EXAMPLE 15

1-carbamoyloxy-2-o-chlorophenyl-2-phenyl-4-pentyne

The alcohol obtained in Example 14 (4.9 g., 0.018 mole) was reacted with phenylchloroformate (3.4 g.) and pyridine (12.5 ml.) in methylenechloride (12.5 ml.), then with liquid ammonia (100 ml.) as described for Example 3(b); 5.9 g. of colorless rhombs were obtained, M.P. 126–7° C.

*Analysis.*—Found (percent): C, 69.1; H, 5.2; N, 11.5. $C_{18}H_{16}ClNO_2$ requires (percent): C, 69.1; H, 5.14; Cl, 11.3.

EXAMPLE 16

Ethyl 2-(p-chlorophenyl)-2-phenyl-4-pentynoate

Ethyl 2(-(p-chlorophenyl)-2-phenyl-acetate (13.7 g., 0.05 mole) was reacted with propargyl bromide (6.24 g., 0.052 mole) and sodium amide (2.05 g.) as described in Example 13. The title compound (12.9 g.) was obtained as colorless oil. B.P.$_{0.002\ mm.}$ 124–7° C.

*Analysis.*—Found (percent): Cl, 11.6. $C_{19}H_{17}ClO_2$ requires (percent): Cl, 11.4

EXAMPLE 17

2-(p-chlorophenyl)-2-phenyl-4-pentyne-1-ol

The ester from Example 16 (11.0 g., 0.035 mole) was reduced with lithium aluminum hydride (5.3 g.) in tetrahydrofuran (300 ml.) as described for Example 2. The product was a colorless oil (6.8 g.) B.P. $_{0.1\ mm.}$ 166–8° C., and was 98% pure by gas-liquid chromatography.

*Analysis.*—Found (percent): C, 74.3; H, 6.0; Cl, 12.1. $C_{17}H_{15}ClO$ requires (percent): C, 75.4; H, 5.6; Cl, 13.1

EXAMPLE 18

1-carbamoyloxy-2-(p-chlorophenyl)-2-phenyl-4-pentyne 2-(p-chlorophenyl)-2-phenyl-4-pentyne-1-ol (3.8 g., 0.014 mole) was reacted with phenyl chloroformate (2.61 g., 0.014 mole) and pyridine in methylene chloride (10 ml.). After treatment with liquid ammonia as described in Example 3(b), 2.38 g. of colorless rhombs were obtained which after recrystallization from benzene-petrol had M.P. 139–141° C.

*Analysis.*—Found (percent): C, 68.8; H, 5.4; N, 4.0. $C_{18}H_{16}ClNO_2$ requires (percent): C, 69.1; H, 5.1; N, 4.5.

EXAMPLE 19

Methyl-2-(2'-propynyl)-2-phenyl-4-pentynoate

Methyl phenylacetate (60.0 g., 0.4 mole) was added dropwise to a suspension of sodium hydride (38.4 g., 0.8 mole of a 50% dispersion in oil) in dry dimethylformamide (200 ml.) at −10° C. The solution was stirred two hours at 0° C. and propargyl bromide (70.0 g., 0.8 mole) in dry dimethyl formamide was added. The brown solution was stirred for ½ hour at room temperature, dimethyl formamide (100 ml.) added and the mixture stirred for a further hour. The reaction mixture was poured into water and extracted with benzene. After removal of the benzene a brown oil was obtained which deposited 60.0 g., of fine needles from benzene/petrol (B.P. 100–120° C.), M.P. 76.8° C.

*Analysis.*—Found (percent): C, 79.1; H, 6.4. $C_{15}H_{14}O_2$ requires (percent): C, 79.6; H, 6.2.

EXAMPLE 20

2-phenyl-2-(2'-propynyl)-4-pentyn-1-ol

The ester from Example 19 (24.0 g., 0.1 mole) was reduced with lithium aluminum hydride as described in Example 2. The product (13.1 g.) was recrystallized from benzene/petrol (B.P. 60–80° C.) to give colorless needles, 8.9 g., M.P. 56–7° C.

*Analysis.*—Found (percent): C, 85.0; H, 7.0. $C_{14}H_{14}O$ requires (percent): C, 84.8; H, 7.1.

EXAMPLE 21

1-carbamoyloxy-2-phenyl-2-(2'-propynyl)-4-pentyne 2-phenyl-2-(2'-propnyl)-4-pentyn-1-oil (7.0 g., 0.03 mole) was treated with pyridine (5 ml.) and phenyl chloroformate (5.6 g., 0.03 mole) in methylene chloride (10 ml.) as described in Example 3(b). After treatment with liquid ammonia (100 ml.) 4.8 g. of solid was obtained. On recrystallization from benzene-petrol B.P.

60-80° C., 4.4 g., M.P. 90-91° C. of colorless needles were obtained.

*Analysis.*—Found (percent): C, 74.6; H, 6.3; N, 5.9. $C_{15}H_{15}NO_2$ requires (percent): C, 74.7; H, 6.2; N, 5.8.

EXAMPLE 22

Ethyl 2-phenyl-2-propyl-4-pentynoate

Ethyl 2-phenyl-pentanoate (82.0 g., 0.5 mole) was reacted with sodamide (20.0 g., 0.05 mole) and propargyl bromide (40 ml., 0.5 mole) in liquid ammonia as described in Example 13. The product was isolated by distillation and 69.0 g., B.P. 110–112° C. of colorless oil was obtained.

EXAMPLE 23

2-phenyl-2-propyl-4-pentyn-1-ol

Ethyl 2-phenyl-2-propyl-4-pentynoate (24.4 g., 0.1 mole) was reduced with lithium aluminum hydride (3.8 g., 0.1 mole) in ether as described for Example 2. After distillation 13.4 g., B.P. 102–3° C. at 1.5 mm. of a colorless oil was obtained.

EXAMPLE 24

1-carbamoyloxy-2-phenyl-2-propyl-4-pentyne 2-phenyl-2-propyl-4-pentyne-1-ol (5.0 g., 0.025 mole) was reacted with pyridine (15 ml.), phenylchloroformate (0.025 mole) then liquid ammonia (100 ml.) as described for Example 3(b), 4.5 g. of colorless rhombs, M.P. 75.6° C. were obtained and recrystallized from benzene-petrol B.P. 100–120° C.

*Analysis.*—Found (percent): N, 5.6. $C_{15}H_{19}NO_2$ requires (percent): N, 5.7.

EXAMPLE 25

N-methylcarbamoyloxy-2-phenyl-2-propyl-4-pentyne

The procedure of Example 5 was followed useing 2-phenyl-2-propyl-4-pentyn-1-ol (5.0 g., 0.025 mole) triethylamine (5 ml.) and methyl isocyanate (6.4 g., 0.125 mole). The carbamate was obtained as a colorless viscous oil. B.P.$_{0.025\ mm.}$ 138–140° C.

*Analysis.*—Found (percent): C, 73.7; H, 8.3; N, 5.4; $C_{16}H_{21}NO_2$ requires (percent): C, 74.1; H, 8.1; N, 5.4.

What is claimed is:

1. An acetylenically substituted aralkyl carbamate having the formula:

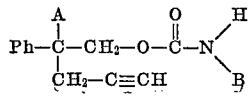

wherein A is a member of the group consisting of phenyl, chlorophenyl, benzyl, propyl, propargyl, hydroxymethyl, and carbamoyloxymethyl, and B is a member of the group consisting of hydrogen and alkyl groups containing from one to four carbon atoms.

2. A compound according to claim 1 which is 1-carbamoyloxy-2,2-diphenyl-4-pentyne.
3. A compound according to claim 1 which is 1-(n-butylcarbamoyloxy)-2,2-diphenyl-4-pentyne.
4. A compound according to claim 1 which is 1-(methylcarbamoyloxy)-2,2-diphenyl-4-pentyne.
5. A compound according to claim 1 which is 1-carbamoyloxy-2-benzyl-2-phenyl-4-pentyne.
6. A compound according to claim 1 which is 2-phenyl-2-(2'-propynyl)-1,3-propanediol monocarbamate.
7. A compound according to claim 1 which is 2-phenyl-2-(2'-propynyl)-1,3-propanediol dicarbamate.
8. A compound according to claim 1 which is 1-carbamoyloxy-2-(o-chlorophenyl)-2-phenyl-4-pentyne.
9. A compound according to claim 1 which is 1-carbamoyloxy-2-(p-chlorophenyl)-2-phenyl-4-pentyne.
10. A compound according to claim 1 which is 1-carbamoyloxy-2-phenyl-2-(2'-propynyl)-4-pentyne.
11. A compound according to claim 1 which is 1-carbamoyloxy-2-phenyl-2-propyl-4-pentyne.
12. A compound according to claim 1 which is 1-methylcarbamoyloxy-2-phenyl-2-propyl-4-pentyne.

References Cited

UNITED STATES PATENTS

| | | | |
|---|---|---|---|
| 2,791,603 | 5/1957 | Bavley et al. | 260—463 |
| 2,798,885 | 7/1957 | Ensslin et al. | 260—482 |
| 2,816,910 | 12/1957 | Junkmann | 260—482 |
| 3,046,302 | 7/1962 | Oja | 260—482 |

CHARLES B. PARKER, Primary Examiner

P. J. KILLOS, Assistant Examiner

U.S. Cl. X.R.

260—247.2, 269, 294, 295, 298, 326.8, 326, 82, 332.2, 347.3, 455, 463, 469, 471, 476, 618; 424—311